United States Patent Office 3,284,373
Patented Nov. 8, 1966

3,284,373
MOLDED CARBON BODIES
William Joseph Metrailer, Baton Rouge, La., assignor to Esso Research and Engineering Company, a corporation of Delaware
No Drawing. Filed June 16, 1964, Ser. No. 375,636
4 Claims. (Cl. 252—506)

This invention relates to a process for making carbon electrodes from coke aggregate compositions comprising relatively nonreactive coke aggregate and relatively nonreactive binder coke material. This invention relates to the preparation of coke electrodes which can be used in aluminum reduction cells. This application relates to a process of making coke electrode compositions of improved dusting characteristics which comprises formulating a composition of relatively low reactivity coarse coke aggregate and/or fine coke aggregate and relatively low reactivity binder coke, which materials on being molded into electrode bodies and baked to provide uniform consumption of the coke material throughout the electrode and substantially minimize dusting of the electrode during the reduction of aluminum.

More particularly, the present invention relates to a process of reducing the reactivity of the binder coke in a coke electrode formulation which comprises adding boria to the binder material prior to mixing the binder with the coke aggregate. Boria added to the binder material reduces the reactivity of the binder. The coke aggregate plus binder are then molded and used to form prebaked electrodes or are used to form Soderberg electrodes.

In using electrodes made from coke in the electrolytic reduction of alumina, one of the primary problems has been the dusting of the electrodes during the reduction due to the different rate of consumption of the coke aggregate particles and the binder coke. The binder coke is the carbonaceous deposit from the pitch binder formed during the baking of the electrodes. The higher rate of consumption of the binder coke relative to the coke aggregate particles in the electrode formulation is attributed to the difference in reactivity between the coke aggregate particles and the reactivity of the binder coke. This results in loosening the coke particles from the electrodes before they are fully consumed. The coke aggregate components that are consumed more slowly fall off the electrodes giving the rise to particles of loose carbon which are called dust. This carbon dust can short circuit the electrolysis bath and represents lost coke, that is, coke that does not reduce alumina.

Coke electrodes are generally formed by mixing ground coke aggregate with a binder material, molding the mixture under pressure and baking at elevated temperature for several hours. The baking step at elevated temperature removes substantially all of the volatile hydrocarbon material from the binder material leaving a residual binder coke which binds together the larger coke aggregate particles.

It is known to mix boria compounds with coke aggregate and binder formulations in amounts of 0.2–1% by weight based on total weight of the electrode formulation. The boria in this case is mixed throughout the electrode formulation. The formulation containing the boria is compressed into electrodes and baked to remove volatile materials. The addition of the boria to the formulation allegedly provides markedly reduced carbon consumption of the electrodes during the reduction of alumina. Though the addition of the boria dispersed throughout the electrode formulation may in some cases reduce the overall carbon electrode consumption in the electrolytic reduction cell, the dusting problem, even with these formulations, was still a major consideration.

A detrimental effect of adding boria to electrode formulations, particularly where the boia is added as boric acid, has been cracking and weakening of the baked electrodes due to the dehydration of the boric acid during the baking step. Further, the amount of boria that has to be added to the entire electrode formulation is considerably more than the amount of boria that has to be added in accordance with applicant's invention to the binder material only. This is because the boria is dispersed throughout the electrode formulation rather than concentrated in the relatively higher reactivity binder coke material where it is used to selectively reduce the reactivity of the binder relative to the coarse coke aggregate.

In accordance with the present invention, a molded coke electrode with minimized dusting characteristics is formulated from coarse, relatively large coke particles having a relatively low reactivity in admixture with a binder coke material prepared in accordance with the present invention, also having relatively low reactivity. The improved binder material of this invention is prepared from a petroleum based material or coal tar based material by adding 0.2–2.0 wt. percent of $B_2O_3$ to the base material, as for example $H_3BO_3$, dispersing the boria compound in the binder, then heating the mixture to remove any water of hydration in association with the boria material added to the binder. The dehydration step leaves $B_2O_3$ well dispersed throughout the binder. The addition of boria to the binder substantially reduces the reactivity of the binder so that the binder coke remaining, after baking the electrodes, is consumed in the electrode at about the same rate as the nomally less reactive coarse coke aggregate in the electrode. The mixture of coarse coke aggregate and/or fine coke aggregate and binder material containing boria is molded into electrode shapes and baked at elevated temperatures. The baking of the electrode volatilizes the volatile constituents of the binder material leaving about 50 wt. percent of the binder material as binder coke of relatively low reactivity. It is the decrease in reactivity of this binder coke due to the addition of boria to the binder which substantially reduces the dusting problem. The binder material containing boria prepared in the above described manner can also be used in the preparation of Soderberg electrodes.

The removal of the water of hydration of the boria compound, prior to baking the electrode, for example the water associated with $H_3BO_3$, prevents the weakening of the molded carbon electrode which would result from the violent dehydration of the boria compound which occurs if the water of hydration is present during the baking of the electrode.

Several advantages are obtained by preparing the binder and the electrodes in this manner. The addition of the boria to the binder material substantially reduces the total amount of boria needed in a particular electrode formulation, since only about 0.2–2.0% boria based on weight of binder is used in accordance with the present invention. The heretofore described techniques for the addition of boria required the addition of 0.2–1.0% boria to the total electrode aggregate formulation. For example, for an electrode weighing 500 lbs., a 1 wt. percent boria content would require 5 lbs. of boria material, whereas a 500-pound electrode having a 10% binder concentration and a 1% boria based on binder concentration would require only 0.5 lb. of boria in the total electrode formulation. Further, concentrating the boria in the relatively high reactivity binder material substantially and selectively reduces the reactivity of the binder material relative to the coarse coke aggregate in the coke formulation thereby substantially minimizing the dusting problem. Dispersing the boria throughout the coke aggregate formulation does not improve the dusting problem in that it lowers the reactivity of the entire coke aggregate rather than selectively lowering the reactivity of the relatively more reactive binder coke relative to the coarse coke aggegate and the dusting problem would still be present.

In another embodiment of the present invention, the boria is added, for example as boric acid, directly to the hydrocarbon feed fed to the coking process. In this manner 0.1 to 2.0 wt. percent boria is dispersed throughout the coke as formed as $B_2O_3$. This coke is then taken and ground to form fine coke aggregate which is used in making the coke electrodes. The fine coke aggregate containing boria in combination with carbonaceous binder material provides a relatively low reactivity total binder material interspaced between the relatively low reactivity coarse coke aggregate in the formulation. The fine coke aggregate lowers the overall reactivity of the total binder material and substantially reduces the dusting of the coke electrodes. In this embodiment the boria as $B_2O_3$ is present in the coke produced in the amount of 0.1–1.0 wt. percent based on total fines and binder material. Fluid coke, as well as delayed coke, can be used to prepare the fine coke aggregate containing the boria. An added advantage in preparing the fines coke in this manner is that the boria compound used is dehydrated during the formation of the coke.

There are three principal types of coke materials that can be used in formulating coke electrodes for the reduction of aluminum. They are delayed cokes formed by batch destructive distillation of petroleum hydrocarbons, which cokes are then calcined, fluid cokes formed by surface deposition of coke at relatively low temperatures of 900–1200° F., which cokes are then calcined, and fluid cokes formed by surface deposition of coke at temperatures above about 1900° F., which coke materials do not need calcining.

The boria for the binder material can be obtained from several sources. Boric acid has proved to give the best results in the present process but other boria compounds can be used. For example, boron can be added to the binder in the form of ammonium borate, or in the form of organic boron compounds, such as methyl borate. Regardless of the source of the boria, the binder plus the boria is heat treated to remove water of hydration prior to mixing the binder and boria with the coke aggregate formulation used in making electrodes. Boric acid has the formula of $H_3BO_3$ and, on heating, two molecules of boric acid are dehydrated to give 3 moles of water and 2 molecules of $B_2O_3$.

In the manufacture of the electrode itself, the coke aggregate formulation used is mixed and fed together with the carbonaceous binder containing the boria material to the electrode fabrication system.

The binders used are conventional and include material, such as aromatic coal tar pitch binders and petroleum pitch binders. Such binders generally have melting points between the range of 70–120° C. They usually contain small amounts of hydrogen (about 5% or less). The binder is utilized in an amount of about 10–40 parts by weight per 100 parts of coke aggregate in the formulation blend, depending on the type of coke used, the particle size distribution of the coke aggregate, and the type of electrodes to be made.

In general, two types of electrodes are employed by the aluminum industry: (a) prebaked and (b) Soderberg self-baking electrodes. In the former, a mixture comprising about 80–91% of coke aggregate and about 9–20 wt. percent of treated pitch binder based on total weight of electrode mix are molded at pressures of about 3000–10,000 p.s.i. or extruded and then baked for periods up to 30 days at about 1800–2200° F. Prior to mixing the binder with the coke aggregate formulation, the binder is treated to dehydrate the boria dispersed in the binder. These preformed electrodes are then used in electrolytic reduction cells by slowly lowering them in the molten alumina as they are consumed. Butts of the unconsumed electrodes are reground and used in subsequent electrode aggregate formulations.

The Soderberg process involves the continuous or intermittent addition of a mixture of coke and binder introduced as a paste to the top of the cell as the electrode components in the lower part of the cell are consumed. In this operation, the paste comprises a blend of about 60–84 wt. percent coke aggregate and 16–40 wt. percent binder based on total weight of electrode mix. The cell is usually operated at temperatures of 1700–1900° F. and the electrodes are gradually consumed in reducing the alumina. The paste is baked into a hard electrode between the time it is added at the top of the cell and the time it is used by the heat from the reduction cell. The Soderberg process does not produce any unused butt materials.

In the electrolytic reduction of alumina using coke electrode formulations, carbon dioxide is formed in the reduction of alumina to aluminum metal. The carbon dioxide formed is in contact with the coke electrode and has a tendency to oxidize some of the coke from the electrodes. This oxidation reaction results in the conversion of some of the carbon in the electrode to carbon monoxide. The technique for measuring the reactivity of the coke aggregate consists of taking a sample of 14–35 mesh material and contacting the sample with a stream of carbon dioxide gas at a constant temperature of about 1742° F. The relative reactivity of the coke sample is determined by measuring the amount of coke weight lost on contact with the carbon dioxide per unit time. The relative reactivity of the coke aggregate samples under these test conditions is related to the reactivity of molded coke electrodes formed therefrom.

The advantages of using applicant's binder containing boria dispersed therein will accrue to any coke formulations used. This includes coke formulations comprising substantially only coarse coke aggregate, coke formulations comprising only fine aggregate, and coke formulations comprising aggregates containing various proportions of coarse aggregate and fine aggregate. A preferred coke aggregate formulation is prepared by using a dumbbell particle size distribution with below about 10 wt. percent of aggregate particle size overlap. It is preferred that at least a portion of the fine aggregate be sufficiently small so that the fine aggregate, in conjunction with the binder, will form a suitable filler material to cement the large coarse coke aggregate together into a high density, high crush material molded electrode. Suitable coarse coke aggregate size particles will be particles having a particle size wherein 90 wt. percent of the particles are between 2 and 48 mesh (about 3000–10,000 microns). The fines materials which can be used to form the electrode formulation will have about 90 wt. percent of the particles smaller than 100 mesh (150 microns), and preferably 40 wt. percent smaller than 325 mesh (44 microns). The amount of fines used will depend on the particular use to which the electrode is to be put, but would generally be in the amount of 10–50 wt. percent of fines based on total electrode aggregate formulation.

Depending on the particular particle size and particle size distribution of the coke aggregate, binder is used in an amount of 9 wt. percent to 40 wt. percent, based on total weight of electrode mix. With prebaked electrodes, the binder content will be about 9–16 wt. percent, and with Soderberg electrodes the binder content will be 18–32 wt. percent. The amount of boria in the binder will be between 0.2 and 2 wt. percent $B_2O_3$ based on total weight of binder. Preferably, 0.5 to 1.5 wt. percent of $B_2O_3$ is used. The amount of boria added to the binder will depend upon the relative reactivity of the binder coke material as compared with the reactivity of the coke aggregate making up the coke formulation. A sufficient amount of boria compound, for example boric acid, is added to the binder to obtain this amount after dehydration of the boria compound in the binder.

The binder, after being thoroughly mixed with the boria compound, is subjected to temperatures of about 200–800° F., and more generally 375 to 600° F., to remove the water of hydration of the boria compound used from the binder. The binder is then mixed with the coke aggregate to form the electrodes.

The invention may be better understood with reference to the following examples which are illustrative of the present invention and are not intended to reduce the scope of the invention.

*Example 1*

A calcined petroleum coke sample having an identical source and particle size distribution was used in all tests. Three test electrodes were prepared. The first electrode (A) had a petroleum pitch binder. The second electrode (B) had an identical petroleum pitch binder containing 0.28 wt. percent of $B_2O_3$ based on total weight of electrode mix added to the coke and binder mixture as $H_3BO_3$. The third electrode (C) had an identical petroleum pitch binder which was mixed with $H_3BO_3$ and then heated to 600°F. to remove the water of hydration from the boric acid. The resulting binder had 1% $B_2O_3$ in the binder based on weight binder. The electrodes were all baked at 2000° F. under identical conditions to coke out the binder and, in case of the second electrode, dehydrate the boric acid. Test specimens were cored from the electrodes and tested for reactivity by exposing them to a flowing stream of $CO_2$ for 4 hours at 1000° C. The specimens were weighed before and after exposure to $CO_2$ and the weight loss or consumption calculated. The specimens were then brushed with a stiff bristle brush to remove loose carbon and the loose carbon or dust was calculated. The results obtained are shown below in Table I.

TABLE I

| Electrode [1] | Binder [2] | Additive | Wt. Percent Consumed in 4 hrs. at 1,000° C. | Wt. Percent Loose Carbon Formed |
|---|---|---|---|---|
| A | Petroleum | None | 6.49 | 4.10 |
| B | do | 0.28% $B_2O_3$ [4] | 6.04 | 5.40 |
| C | do | 1.0% $B_2O_3$ [3] | 4.51 | 0.93 |

[1] The coke aggregate had the following particle size distribution: 60% of the coke was between 4 and 48 mesh and 40% of the coke smaller than 48 mesh. The coke was obtained from a commercial calcined delayed coke source and ground to a suitable size.
[2] The petroleum based binder had the following physical characteristics: Specific gravity, 1.2570 gm./cc.; softening point, 239° F.; a coking value of 57.1 wt. percent. Sixteen percent binder based on total aggregate was used.
[3] The boria was added to the binder in an amount of 1.77% as $H_3BO_3$ and heated to 600° F. to dehydrate the $H_3BO_3$ and to leave 1.0% of $B_2O_3$ based on binder.
[4] Eight grams of $H_3BO_3$ was added to the total coke aggregate mixture. This corresponds to 0.28% $B_2O_3$ based on total aggregate.

It is seen from the above data that the coke electrode (A) had a higher rate of consumption and gave more dust than the electrode formulated with binder containing 1% $B_2O_3$ (C). The addition of the $B_2O_3$ to the entire electrode mix as $H_3BO_3$ (B) gave only a slight improvement in consumption but was worse in dusting. The adverse effect on dusting is believed to be associated with the effluorescence associated with the dehydration of the boria dispersed throughout the electrode mix during the baking step. The incorporation of the $B_2O_3$ into the binder by mixing the binder with $H_3BO_3$ and then dehydrating the $H_3BO_3$ before incorporating the binder into an electrode mix not only reduced the consumption of electrode but also substantially reduced the dust formed. The substantial reduction in dusting is believed to be due to reducing the relative reactivity of the binder coke material and to removing the water of hydration from the binder prior to the baking step.

*Example 2*

In order to show the effect of the addition of boria to a coal tar pitch binder and dehydration of the boria compound, the following test was carried out. In this test the coal tar binder was mixed with a sufficient amount of boric acid to give an overall content of 1% $B_2O_3$ dispersed in the coal tar binder. This sample was heated to 600° F. to dehydrate the boric acid. The thus treated binder material was then coked to a temperature of 2000° F. in a period of 48 hours. Another sample containing no boric acid from the same coal tar source was prepared and coked to a temperature of up to 2000° F. in a period of 48 hours. The two binder coker materials were then tested for reactivity with the following results reported below in Table II.

TABLE II

| Wt. Percent Consumed | Reactivity,[3] mg./gm./min. | |
|---|---|---|
| | Coal Tar [1][2] | Coal Tar+1% $B_2O_3$ |
| 10 | 7.1 | 2.7 |
| 20 | 7.6 | 1.4 |
| 30 | 8.3 | 0.5 |
| 40 | 8.9 | |

[1] The coal tar binder had the following physical characteristics: Specific gravity, 1.312 gm./cc.; softening point, 215° F.; a coking value of 67.5 wt. percent.
[2] The binder was coked at 2,000° F. to yield 70% of coke based on binder.
[3] The test consisted of treating the binder coke at 1,000° C. in a stream of $CO_2$ for varying times up to about 80 minutes.

The binder coke made from the binder alone had an initial reactivity of 6.6 and the reactivity increased as the coke was consumed. Coke made from binder oil with 1% boria added had an initial reactivity of 3.9, but the reactivity fell off as the coke was consumed. These results clearly show the decrease in binder coke reactivity obtained by the addition of $B_2O_3$ in the binder and dehydration of the binder prior to coking the binder.

*Example 3*

In another example, 1 wt. percent of $B_2O_3$ was added to a vacuum residuum and the mixture destructively distilled to form a coke product. The coke product was heated to remove the volatile hydrocarbon constituents and then tested for reactivity to $CO_2$ at 1742° F. The rate of the reaction of the coke product which contained 0.95 wt. percent of $B_2O_3$ was compared with the reactivity of a coke sample prepared in a similar manner but containing no $B_2O_3$. The reactivity of the coke with $B_2O_3$ was about 1/10 of that of the coke prepared in a similar manner without the boria addition. This technique of adding boria feed to the coking step prior to coking is effective in preparing the coke material of reduced reactivity. The coke material of reduced reactivity coke can then be ground to form the fine coke aggregate in the coke formulation and will reduce the dusting that would normally occur due to the relatively higher reactivity of the coke binder. The lower reactivity fines material would provide a diffusion barrier for the combustion of the relatively higher reactivity coke binder, thereby substantially reducing the consumption of the binder and reducing the dusting problems.

The above results clearly illustrate the novel and inventive features of the present invention. From the above results it is clearly seen that when a coke aggregate electrode formulation containing coke aggregate of relatively low reactivity is admixed with a binder material, which binder material has first been mixed with a boria compound and heated to dehydrate the water of hydration, then added to the coke aggregate formulation to form coke electrode bodies, substantially less dusting of the coke electrode occurs. In accordance with carrying out the preparation of electrodes in the manner described in the present invention, the minimization of the dusting of the coke electrodes is primarily a function of adding a boria compound to the binder material, treating the binder material to remove the water of hydration, then mixing the dehydrated boria-binder material with the coke electrode formulation and forming electrodes. Coke aggregate from other sources than petroleum coke can be utilized in making carbon bodies of improved dusting characteristics.

The coke formulations of the present invention can be used as refractory lining, baked electrodes other than for aluminum reduction, or anywhere where dusting of the molded carbon body is a problem.

It is to be understood that the invention is not to be limited to the specific examples which have been offered merely as an illustration, and that modifications may be made by those skilled in the art without departing from the invention.

We claim:
1. A process for forming a molded coke body comprising the steps of
   (a) mixing a pitch binder with a sufficient amount of boric acid so that after dehydration said binder will contain 0.2–2.0 wt. percent, based on the total weight of said binder, of $B_2O_3$,
   (b) heating the mixture prepared in step (a) at a temperature of 200–800° F. to dehydrate the boric acid,
   (c) mixing the $B_2O_3$ containing pitch binder with an aggregate of coke particles,
   (d) heating the mixture prepared in step (c) at a temperature of 1700–2200° F. for a period of time sufficient to convert the pitch binder to binder coke, and
   (e) recovering a molded coke body in which the coke particles are bound together with a $B_2O_3$ containing binder coke.

2. A process for forming a molded carbon electrode comprising the steps of
   (a) mixing a pitch binder with a sufficient amount of boric acid so that, after dehydration of the acid, the said binder will contain 0.5–1.5 wt. percent of $B_2O_3$, based on the total weight of said binder,
   (b) heating the mixture prepared in step (a) at a dehydration temperature of 375–600° F.,
   (c) mixing the $B_2O_3$ containing pitch binder with an aggregate of coarse and fine calcined fluid coke particles,
   (d) heating the mixture prepared in step (c) at a temperature of 1700–2200° F. for a period of time sufficient to convert the pitch binder to binder coke, and
   (e) recovering a molded carbon electrode in which the coke particles are bound together with a $B_2O_3$ containing binder coke.

3. The process of claim 1 wherein the coke aggregate is selected from the group consisting of calcined delayed coke, calcined fluid coke, and high temperature fluid coke.

4. The process of claim 1 wherein the pitch binder material is selected from the group consisting of coal tar pitch and petroleum pitch.

References Cited by the Examiner

UNITED STATES PATENTS

| 2,527,596 | 10/1950 | Shea et al. | 252—502 |
| 3,037,756 | 6/1962 | Ornitz | 106—56 |
| 3,084,394 | 4/1963 | Bickerdike et al. | 264—105 |

FOREIGN PATENTS

| 656,694 | 1/1963 | Canada. |

LEON D. ROSDOL, *Primary Examiner.*

JULIUS GREENWALD, ALBERT T. MEYERS, *Examiners.*

J. D. WELSH, *Assistant Examiner.*